United States Patent Office 2,763,092
Patented Sept. 18, 1956

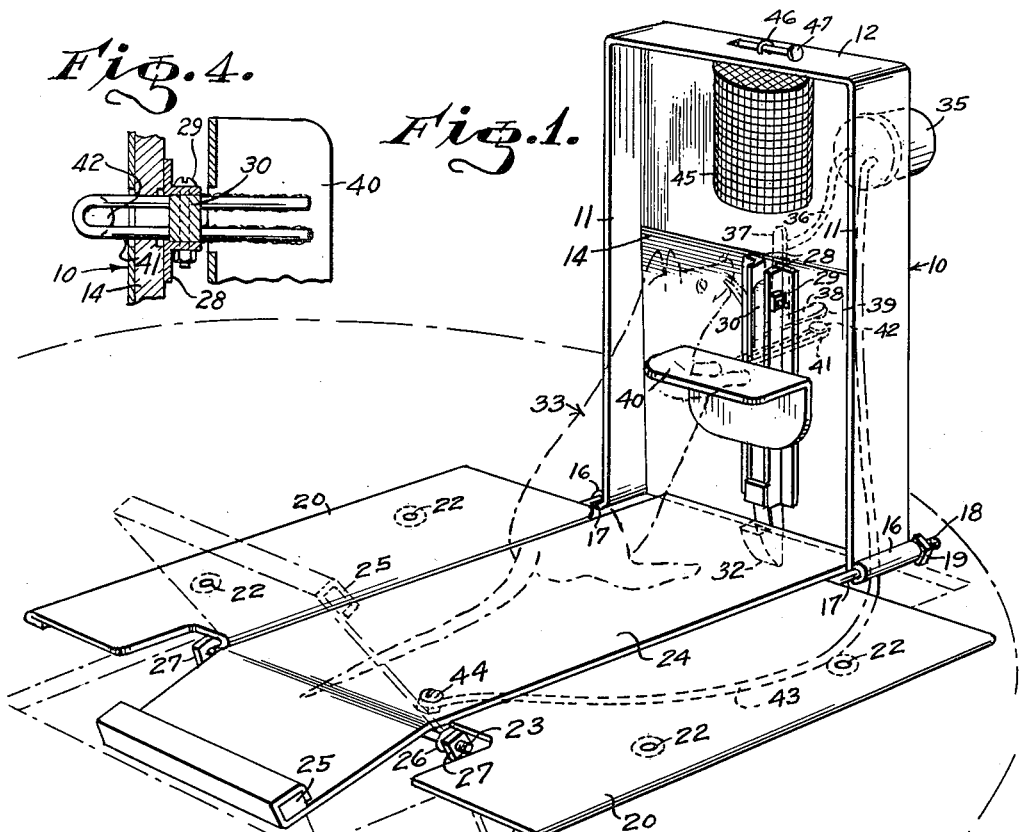

2,763,092

RAT TRAP

George T. Sheridan, Fort Madison, Iowa

Application October 20, 1953, Serial No. 387,156

2 Claims. (Cl. 43—99)

This invention relates to a trap, and more particularly to an electrically operated rat trap.

The object of the invention is to provide a rat trap which will automatically electrocute the rat when the rat engages the proper portion of the trap.

Another object of the invention is to provide a rat trap which will discharge the electrocuted rat into a suitable receptacle and wherein the trap will automatically become reset, the trap remaining baited at all times.

A further object of the invention is to provide a rat trap which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view of the rat trap, constructed according to the present invention.

Figure 2 is a fragmentary longitudinal sectional view taken through the rat trap.

Figure 3 is a fragmentary sectional view showing certain constructional details of the rat trap.

Figure 4 is a sectional view of the foot rest and latch taken on the line 4—4 of Figure 2.

Figure 5 is a sectional view of the latch taken on the line 5—5 of Figure 2.

Referring in detail to the drawings, the numeral 10 designates a body member which can be made of any suitable material, Figure 1, and the body member 10 includes a pair of spaced parallel vertically disposed side walls 11 and a horizontally disposed top wall 12. There is further provided a back member 14 which may be made of a suitable insulating material such as wood. The back member 14 is provided with a cutout 15, Figure 2, for a purpose to be later described.

The lower end of each of the side walls 11 is coiled or shaped to provide a sleeve 16, and a rod 17 extends through each of the sleeves 16, the pair of rods 17 being arranged in spaced parallel relation with respect to each other. An end of each of the rods 17 is threaded as at 18, and a nut 19 is arranged in threaded engagement with each of the threaded portions 18 for maintaining the parts in their proper assembled relation.

A means is provided for securing or attaching the rat trap in any suitable supporting structure, and this means comprises a pair of wings 20 each of which has a collar 21 arranged in engagement with the rods 17. Each of the wings 20 may be provided with a plurality of apertures 22 whereby suitable securing elements such as screws or bolts can be extended therethrough and into engagement with the supporting structure. Hingedly mounted between the pair of wings 20 is a trap door 24, the trap door 24 being hingedly supported on a pin or rod 23 which extends through a pair of eyelets 26 that are formed integral with the ends of the rods 17, Figure 3. A counterweight 25 is secured to an end of the door 24 for normally maintaining the door 24 in the horizontal position shown in Figure 1. Suitable nuts 27 are arranged in engagement with the threaded end portions of the rod 23 for maintaining the parts in their proper assembled relation.

Secured to the back member 14 is a pair of spaced parallel vertically disposed L-shaped bars 28, Figure 1, and pivotally mounted between the pair of bars 28 is a keeper or latch 30, the latch 30 being pivotally mounted by means of a bolt and nut assembly 29. The latch 30 is provided with a recess 31 which defines a shoulder, and the recess 31 is adapted to receive an end of the trap door 24 so as to maintain the trap door 24 in horizontal position until a rat such as the rat 33 (broken lines Figure 1) actuates the trap. The lower end of the latch 30 is further provided with a beveled or tapered surface 32 so as to permit the rat trap to automatically reset itself after an electrocuted rat has been dumped by the trap door into a suitable container or receptacle therebelow. A coil spring 34 is interposed between the latch 30 and the back member 14 for maintaining the parts in the position shown in Figures 1 and 2 until the coil spring 34 is compressed to permit pivoting movement of the trap door.

Secured to the back of the body member 10 is a plug 35 which is adapted to be connected to a suitable source of electrical energy. A wire 36 leads from the plug 35 to a strip 37, and the lower end of the strip 37 is shaped to provide a transverse finger 38 which carries a contact 39. Arranged forwardly of the back member 14 is an L-shaped foot rest 40 which is secured to a movable terminal 41 which projects through the cutout 15. A contact 42 is secured to the terminal 41, and the contact 42 is mounted for movement into and out of engagement with the contact 39 for completing the electric circuit when the rat is in the position shown in Figure 1 in order to electrocute the rat. In Figure 5 there is shown or illustrated the connection between the terminal 41 and latch 30. A wire 43 leads from the plug 35 to a screw 44 which is connected to the trap door 24. The L-shaped foot rest 40 is secured in any suitable manner to the terminal 41, and, as shown in Figure 4, the terminal 41 extends through the latch 30, and the terminal 41 is secured to the latch 30 so that the foot rest 40, terminal 41, and latch 30 move in unison. Thus, when a rodent steps on the foot rest 40, the latch 30 can pivot about the pin 29 and this will permit the contact 42 to engage the contact 39, and at the same time this movement of the latch 30 will permit the trap door 24 to swing downward so that the electrocuted rat will drop into a barrel or the like.

Dependingly supported by the top wall 12 is a container 45 which may be made of a suitable reticulated material such as wire. The container 45 is provided with an eyelet 46 through which a suitable securing element extends such as a nail 47 in order to maintain the container 45 in its proper suspended position, as shown in Figure 1. Bait 48 which may be made of any suitable material such as cheese is positioned within the container 45.

From the foregoing it is apparent that a rat trap has been provided which will automatically electrocute a rat as the rat goes for the bait 48. In use the parts are arranged as shown in Figures 1 and 2, and when the rat such as the rat 33 goes after the bait 48 in the container 45, the rat will put his front legs on the foot rest 40. This will cause several things to happen. Thus, the contact 42 will be moved into engagement with the contact 39 to thereby complete the electric circuit from the plug 35 through the wire 36, through the strip 37, through the contact 39, then through the contact 42, then through the terminal 41 and through the foot rest 40 to the rat. Also, the wire 43 will serve to complete the circuit through the metal trap door 24. Furthermore, when the rat steps on the foot rest 40 the lower end of the latch 30 will be moved inwardly to compress the coil spring 34 and to release the door 24 from engagement with notch 31 so that the weight of the rat will cause the trap door 24 to pivot or move from the solid line position shown in Figure 1 to the dotted or broken line position of Figure 1. Thus, the electrocuted rat will be automatically dropped into a barrel, container or other receptacle to which the trap may be secured by means of the wings 20.

As soon as the electrocuted rat has been dropped into the receptacle through the trap door 24, the weight 25 will cause the trap door 24 to return from the broken line position of Figure 1 to the solid line position and the beveled edge 32 of the latch 30 will permit the trap door 24 to move up and engage the recess 31 so that the door will be held in its horizontal position until the next rat goes after the bait 48.

The various parts of the trap can be made of an electric conducting material such as metal except the back member 14 is non-conducting and may be made of wood. When the rat goes after the bait 48 the rat puts its front feet on the foot rest 40. The contact points 39 and 42 may be made of any suitable material such as platinum. The container 45 for the bait 48 prevents the bait from being wasted since the rat does not remove the bait from the container. The trap of the present invention can be manufactured simply and inexpensively and the trap can be put on any container which is constructed so that swinging movement of the trap door 24 is permitted. If desired, the trap can be mounted above or adjacent the top of a barrel which has water in it so that in the event the electric current is not sufficient to electrocute the rat the rat will drown. Or, by omitting the electric current the water in the barrel or other container will drown the rat when the trap door 24 drops the rat in the barrel. The spring 34 normally maintains the latch 30 in the position shown in Figure 2 and the trap is easy to take apart for shipment or storage. When the rat puts its feet on the foot rest 40, the hind feet of the rat are on the trap door 24 so that when when the rat puts his weight on the foot rest 40 the platinum points 39 and 42 will come together to complete the circuit and electrocute the rat. At the same time the rat will be dropped in the container since the trigger or latch 30 will be moved inwardly to release the trap door. By means of the nuts 19 on the threaded portions 18 of the rods 17, the trap door can be adjusted so as to insure that the trap door trips at the same time that the rat is electrocuted. From the foregoing it will be seen that the trap is set ready for another rat at all times and the trap always remains baited.

I claim:

1. A trap comprising a vertically disposed body member including a back wall, a horizontally disposed top wall, and spaced parallel vertically disposed side walls, a pair of horizontally disposed wings arranged contiguous to the lower end of said body member and adapted to be connected to a supporting structure, a trap door hingedly mounted between said pair of wings, a reticulated container supported by said top wall for supporting bait therein, a plug secured to said body member and adapted to be connected to a source of electrical energy, a wire electrically connecting said plug to said trap door, a conductor strip connected to the back wall of said body member and electrically connected to said plug, a horizonally disposed contact portion extending outwardly from said strip, a pair of spaced parallel bars secured to the inner surface of said body member, a terminal element movably mounted between said bars and mounted for movement into and out of engagement with said contact, an L-shaped foot rest secured to said terminal element, a latch pivotally mounted between said pair of bars and adapted to be moved by applying pressure on said foot rest, a weight mounted on an end of said trap door, and a coil spring interposed between said latch and back wall, there being a cutout in said latch defining a shoulder for receiving said trap door, the lower end of said latch being beveled.

2. In a trap, a vertically disposed body member including a back wall, a horizontally disposed top wall, and spaced parallel vertically disposed side walls, the lower end of each of said side walls being coiled to provide a sleeve, a rod extending through each of said sleeves, an eyelet formed on the end of each of said rods, a pin extending between said eyelets, a pair of horizontally disposed wings arranged contiguous to the lower end of said body member and having collar portions arranged in engagement with said rods, a trap door hingedly mounted on said pin and positioned between said pair of wings, a reticulated container supported by said top wall for supporting bait therein, a plug secured to said body member and adapted to be connected to a source of electrical energy, a wire electrically connecting said plug to said trap door, a conductor strip connected to the back wall of said body member and electrically connected to said plug, a horizontally disposed contact portion extending outwardly from said strip, a pair of spaced parallel bars secured to the inner surface of said body member, a terminal element movably mounted between said bars and mounted for movement into and out of engagement with said contact, there being a cutout in said back wall for the projection therethrough of said terminal element, an L-shaped foot rest secured to said terminal element, and a latch pivotally mounted between said pair of bars and adapted to be moved by applying pressure on said foot rest, a weight mounted on an end of said trap door, and a coil spring interposed between said latch and back wall, there being a cutout in said latch defining a shoulder for receiving a portion of said trap door, the lower end of said latch being beveled so as to permit the rat trap to automatically reset itself after an electrocuted rat has been dumped by the trap door into a suitable container or receptacle therebelow.

References Cited in the file of this patent

UNITED STATES PATENTS

| | | |
|---|---|---|
| 123,779 | Hill | Feb. 20, 1872 |
| 842,837 | Kunkel | Jan. 29, 1907 |
| 1,055,645 | Miller | Mar. 11, 1913 |
| 1,217,350 | Saxon et al. | Feb. 27, 1917 |
| 2,163,577 | Allen | June 27, 1939 |

FOREIGN PATENTS

| | | |
|---|---|---|
| 447,499 | France | Oct. 30, 1912 |